US012267226B2

United States Patent
Dong et al.

(10) Patent No.: US 12,267,226 B2
(45) Date of Patent: Apr. 1, 2025

(54) ROUTING CONTROL METHOD AND APPARATUS

(71) Applicant: Huawei Technologies Co., Ltd., Shenzhen (CN)

(72) Inventors: Jie Dong, Beijing (CN); Zongpeng Du, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 421 days.

(21) Appl. No.: 17/707,177

(22) Filed: Mar. 29, 2022

(65) Prior Publication Data

US 2022/0224631 A1 Jul. 14, 2022

Related U.S. Application Data (63) Continuation of application No. PCT/CN2020/119148, filed on Sep. 30, 2020.

(30) Foreign Application Priority Data

Sep. 30, 2019 (CN) .......................... 201910945856.9

(51) Int. Cl.
*H04L 45/00* (2022.01)
*H04L 45/02* (2022.01)

(52) U.S. Cl.
CPC .................................. *H04L 45/04* (2013.01)

(58) Field of Classification Search
CPC ....................................................... H04L 45/04
See application file for complete search history.

(56) References Cited

U.S. PATENT DOCUMENTS 10,637,768 B1* 4/2020 Joseph ................... H04L 45/02
10,826,826 B1* 11/2020 Wang ..................... H04L 45/04
(Continued)

FOREIGN PATENT DOCUMENTS

CN 105634940 A 6/2016
CN 107370675 A 11/2017
(Continued)

OTHER PUBLICATIONS

K. Talaulikar et al., "Flexible Algorithm Definition Advertisement with BGP Link-State," draft-ietf-idr-bgp-ls-flex-algo-01, Jul. 8, 2019, 15 pages.
(Continued)

*Primary Examiner* — Fahmida S Chowdhury
(74) *Attorney, Agent, or Firm* — Conley Rose, P.C.

(57) ABSTRACT

A routing control method and apparatus includes receiving, by a first edge routing node, a BGP control packet, where the BGP control packet carries a first node identifier and first algorithm information, where the first node identifier indicates an SID of a destination routing node on a BGP forwarding path, where the first algorithm information indicates a requirement of the BGP forwarding path, where the first edge routing node belongs to a first AS and the destination routing node belongs to a second AS; determining, by the first edge routing node, forwarding path information of the data packet based on the first node identifier and the first algorithm information in the BGP control packet; and forwarding, by the first edge routing node, the data packet based on the forwarding path information.

20 Claims, 4 Drawing Sheets

(56) References Cited

U.S. PATENT DOCUMENTS

| | | | |
|---|---|---|---|
| 2009/0016365 A1* | 1/2009 | Sajassi | H04L 45/50 370/401 |
| 2012/0120795 A1* | 5/2012 | Shah | H04L 47/125 370/230 |
| 2014/0226531 A1* | 8/2014 | Farkas | H04L 41/0893 370/256 |
| 2014/0269725 A1* | 9/2014 | Filsfils | H04L 45/50 370/392 |
| 2014/0369356 A1* | 12/2014 | Bryant | H04L 45/50 370/392 |
| 2015/0304206 A1* | 10/2015 | Filsfils | H04L 45/46 709/238 |
| 2017/0099180 A1* | 4/2017 | Singh | H04L 12/4641 |
| 2017/0195210 A1* | 7/2017 | Jacob | H04L 45/02 |
| 2017/0317929 A1* | 11/2017 | Chen | H04L 45/72 |
| 2017/0346718 A1* | 11/2017 | Psenak | H04L 45/02 |
| 2018/0109450 A1* | 4/2018 | Filsfils | H04L 45/04 |
| 2018/0131604 A1* | 5/2018 | Zhou | H04L 45/38 |
| 2019/0020738 A1* | 1/2019 | Paul | H04L 45/58 |
| 2019/0394066 A1* | 12/2019 | Lin | H04L 12/4641 |
| 2020/0162364 A1* | 5/2020 | Chhabra | H04L 43/0852 |
| 2021/0092053 A1* | 3/2021 | Filsfils | H04L 45/74 |
| 2022/0014394 A1* | 1/2022 | Zhao | H04L 45/04 |

FOREIGN PATENT DOCUMENTS

| | | |
|---|---|---|
| EP | 1545072 A1 | 6/2005 |
| EP | 2933958 A1 | 10/2015 |
| JP | 2008211550 A | 9/2008 |
| WO | 2017004778 A1 | 1/2017 |

OTHER PUBLICATIONS

K. Talaulikar, Ed et al., "Flexible Algorithm Definition Advertisement with BGP Link-State," draft-ietf-idr-bgp-ls-flex-algo-03, Jul. 5, 2020, 14 pages.

S. Previdi et al., "Segment Routing Prefix SID extensions for BGP," draft-ietf-idr-bgp-prefix-sid-27, Jun. 26, 2018, 17 pages.

P. Psenak, Ed et al., "IGP Flexible Algorithm," draft-ietf-lsr-flex-algo-02, May 13, 2019, 27 pages.

E. Rosen, RFC 8277, "Using BGP to Bind MPLS Labels to Address Prefixes," Oct. 2017, 23 pages.

C. Filsfils, Ed et al., RFC 8402, "Segment Routing Architecture," Segment Routing Architecture, Jul. 2018, 32 pages.

* cited by examiner

A first edge routing node receives a border gateway protocol (BGP) control packet, where the BGP control packet carries a first node identifier and first algorithm information, the first node identifier indicates an SID of a destination routing node on a BGP forwarding path, the first algorithm information indicates a requirement that the BGP forwarding path meets, the BGP forwarding path includes a routing node that a data packet passes when the data packet is routed from the first edge routing node to the destination routing node, the first edge routing node belongs to a first autonomous system (AS), and the destination routing node belongs to a second AS ~S110

The first edge routing node determines forwarding path information of the data packet based on the first node identifier and the first algorithm information in the BGP control packet, where the forwarding path information is used to indicate a next-hop routing node of the data packet ~S120

The first edge routing node forwards the data packet based on the forwarding path information ~S130

ROUTING CONTROL METHOD AND APPARATUS

CROSS-REFERENCE TO RELATED APPLICATIONS

This application is a continuation of International Patent Application No. PCT/CN2020/119148, filed on Sep. 30, 2020, which claims priority to Chinese Patent Application No. 201910945856.9, filed on Sep. 30, 2019. The disclosures of the aforementioned applications are hereby incorporated by reference in their entireties.

TECHNICAL FIELD

This application relates to the communications field, and more specifically, to a routing control method and an apparatus in the communications field.

BACKGROUND

It is stipulated in Multi-Protocol:Label Switching (MPLS) segment routing (SR) or SR version 6 (SRv6) that a data packet that includes a Border Gateway Protocol (BGP) prefix segment identifier (SID) may be forwarded in the following two manners. In manner 1, a BGP prefix SID list is pushed into an MPLS stack (or an SRv6 segment routing header (SRH)) of the data packet, where the BGP prefix SID list includes a BGP prefix-SID of at least one edge routing node that the data packet passes in sequence in a forwarding process; and the data packet is forwarded based on the BGP prefix-SID of the edge routing node in the BGP prefix SID list. in manner 2, a BGP prefix-SID of a destination routing node is pushed into an MPLS stack (or an SRv6 SRH) of the data packet, and the data packet is forwarded by using the BGP prefix-SID of the destination routing node as a destination.

However, in the foregoing two manners in the conventional technology, all next hops on a BGP forwarding path of the data packet are determined in a default BGP route calculation manner, for example, by using a path-vector routing protocol, resulting in relatively low flexibility.

SUMMARY

This application provides a routing control method and apparatus, so as to determine forwarding path information of a data packet based on a specified requirement that a BGP forwarding path meets, featuring higher flexibility.

According to a first aspect, this application provides a routing control method. The method includes the following.

A first edge routing node receives a BGP control packet. The BGP control packet carries a first node identifier and first algorithm information, the first node identifier indicates a SID of a destination routing node on a BGP forwarding path, and the first algorithm information indicates a requirement that the BGP forwarding path meets. The BGP forwarding path includes a routing node that a data packet passes when the data packet is routed from the first edge routing node to the destination routing node. The first edge routing node belongs to a first autonomous system (AS), and the destination routing node belongs to a second AS.

The first edge routing node determines forwarding path information of the data packet based on the first node identifier and the first algorithm information in the BGP control packet. The forwarding path information is used to indicate a next-hop routing node of the data packet.

The first edge routing node forwards the data packet based on the forwarding path information.

In an example, the first edge routing node may determine, based on the first node identifier and the first algorithm information in the BGP control packet, an SID to be pushed into a label stack of the data packet after the first edge routing node receives the data packet; and forward the data packet based on the pushed SID.

In an example, the first edge routing node may look for, based on the SID pushed into the data packet, an outgoing interface that is to the next-hop routing node of the data packet and that is on the first edge routing node; and send the data packet to the next-hop routing node through the outgoing interface.

By using the routing control method provided in this embodiment of this application, the requirement that the BGP forwarding path meets can be specified, and the forwarding path information of the data packet is determined based on the requirement, featuring higher flexibility.

Optionally, the first node identifier may indicate the SID of the destination routing node in a plurality of manners. This is not limited in this embodiment of this application.

In a possible implementation, the first node identifier may be the SID of the destination routing node.

In another possible implementation, the first node identifier may alternatively be a label index of the destination routing node. Correspondingly, the first edge routing node may determine the SID of the destination routing node based on the label index of the destination routing node and label space of the destination routing node, where the SID of the destination routing node=the label index+the label space.

Optionally, before the first edge routing node determines the SID of the destination routing node based on the label index of the destination routing node and the label space of the destination routing node, each routing node on the BGP forwarding path may publish label space of the routing node to other routing nodes on the BGP forwarding path.

In a possible implementation, the BGP forwarding path includes a second edge routing node, the second edge routing node belongs to the first AS, and the method further includes: The first edge routing node receives a first Interior Gateway Protocol (IGP) control packet, where the first IGP control packet carries a second node identifier, and the second node identifier indicates a first SID of the second edge routing node. That the first edge routing node determines forwarding path information of the data packet based on the first node identifier and the first algorithm information in the BGP control packet includes: The first edge routing node determines the forwarding path information based on the first node identifier and the first algorithm information in the BGP control packet and the second node identifier in the first IGP control packet.

In a possible implementation, the forwarding path information includes an SID of each of at least one routing node that the data packet passes when the data packet is routed from the first edge routing node to the second edge routing node, and each of the at least one routing node belongs to the first AS.

In an example, the first edge routing node may determine, based on the SID that is of the destination routing node and that is indicated by the first node identifier and based on a next hop in the BGP control packet, that when the first edge routing node receives a data packet whose stack top of a label stack is the SID of the destination routing node, a new SID related to the second edge routing node needs to be pushed into the stack top of the label stack.

In an example, the first edge routing node may obtain, through calculation based on the requirement indicated by the first algorithm information and based on the first SID that is of the second edge routing node and that is indicated by the second node identifier, an SID list that is of the second edge routing node and that meets the requirement. The SID list includes the SID of each of the at least one routing node that the data packet passes when the data packet is routed from the first edge routing node to the second edge routing node. In other words, when the first edge routing node receives the data packet whose stack top of the label stack is the SID of the destination routing node, the SID list is further pushed into the stack top of the label stack of the data packet.

In an example, the forwarding path information includes the SID list and the SID of the destination routing node. The SID list in the forwarding path information includes an SID of the next-hop routing node of the data packet. The first edge routing node may determine, based on the SID of the next-hop routing node included in the SID list, an outgoing interface that is for the data packet and that is on the first edge routing node.

In an example, the data packet may be routed from the first edge routing node to the second edge routing node based on the SID included in the SID list in the forwarding path information, and routed from the second edge routing node to the destination routing node based on the SID of the destination routing node in the forwarding path information.

By using the routing control method provided in this embodiment of this application, the data packet may be routed from the first edge routing node to the destination routing node based on the SID of the destination routing node and an SID of each hop of routing node included in the SID list that are pushed into the label stack in sequence. Other passed routing nodes do not need to perform path calculation. Therefore, a calculation workload is relatively light.

In a possible implementation, the BGP forwarding path includes a second edge routing node, the second edge routing node belongs to the first AS, and the method further includes: The first edge routing node receives a second IGP control packet, where the second IGP control packet carries a third node identifier and second algorithm information, the third node identifier indicates a second SID of the second edge routing node, the second algorithm information indicates a requirement that an IGP forwarding path meets, the IGP forwarding path includes at least one routing node that the data packet passes when the data packet is routed from the first edge routing node to the second edge routing node, and the at least one routing node belongs to the first AS. That the first edge routing node determines forwarding path information of the data packet based on the first node identifier and the first algorithm information in the BGP control packet includes: The first edge routing node determines the forwarding path information based on the first node identifier and the first algorithm information in the BGP control packet and the third node identifier and the second algorithm information in the second IGP control packet.

In a possible implementation, the forwarding path information includes the second SID.

In an example, the first edge routing node may determine, based on the SID that is of the destination routing node and that is indicated by the first node identifier and based on a next hop in the BGP control packet, that when the first edge routing node receives a data packet whose stack top of a label stack is the SID of the destination routing node, a new SID related to the second edge routing node needs to be pushed into the stack top of the label stack.

In an example, when the first edge routing node determines that the requirement indicated by the first algorithm information matches the requirement indicated by the second algorithm information, the first edge routing node may determine, based on the requirement indicated by the second algorithm information and based on the second SID that is of the second edge routing node and that is indicated by the third node identifier, a forwarding table entry to the second edge routing node, where the forwarding table entry already exists in the first edge routing node and meets the requirement. The forwarding table entry includes an SID of the next-hop routing node of the data packet. In other words, when the first edge routing node receives the data packet whose stack top of the label stack is the SID of the destination routing node, the second SID is further pushed into the stack top of the label stack of the data packet.

In an example, the forwarding path information includes the second SID and the SID of the destination routing node. The forwarding path information implicitly indicates the SID of the next-hop routing node of the data packet by using the second SID and the forwarding table entry. An outgoing interface that is for the data packet and that is on the first edge routing node is determined based on the SID of the next-hop routing node, and the data packet is sent to the next-hop routing node through the outgoing interface.

In an example, the data packet may be forwarded from the first edge routing node to the second edge routing node based on the second SID in the forwarding path information and the forwarding table entry, and forwarded from the second edge routing node to the destination routing node along a next hop indicated by the SID of the destination routing node.

By using the routing control method provided in this embodiment of this application, in a forwarding process of the data packet, the label stack needs to carry only the second SID and the SID of the destination routing node. Then, the data packet can be routed, based on the second SID and an intra-AS forwarding table, from the first edge routing node to the second edge routing node indicated by the second SID; and routed, based on the SID of the destination routing node and an inter-AS forwarding table, from the second edge routing node to the destination routing node indicated by the SID of the destination routing node. The data packet carries a relatively small amount of data (in other words, a depth of the label stack is relatively shallow).

Optionally, the BGP packet may carry the first node identifier and the first algorithm information in a plurality of manners. This is not limited in this embodiment of this application.

For example, the BGP control packet may include a first type-length-value (TLV). The first TLV carries the first node identifier and the first algorithm information.

For example, the BGP control packet may include a second TLV and a third TLV. The second TLV is used to carry the first node identifier, and the third TLV is used to carry the first algorithm information.

In a possible implementation, the BGP control packet includes a first TLV. The first TLV includes a type (T) field, a length (L) field, and a value (V) field. The T field is used to identify that the first TLV field carries the first node identifier and the first algorithm information, the L field is used to indicate a length of the value (V) field, and the V field carries the first node identifier and the first algorithm information.

Optionally, the first algorithm information may indicate, in a plurality of manners, the requirement that the BGP forwarding path meets. This is not limited in this embodiment of this application.

In a possible implementation, the first algorithm information may include a first algorithm identifier, and the first algorithm identifier indicates the requirement that the BGP forwarding path meets.

In another possible implementation, the first algorithm information may include a first algorithm identifier and at least one of a metric type identifier and a calculation type identifier. The metric type identifier is used to indicate a metric type in the requirement that the BGP forwarding path meets, and the calculation type identifier is used to indicate a calculation type in the requirement that the BGP forwarding path meets.

In a possible implementation, the metric type includes at least one of an IGP metric, a low latency metric, and a traffic engineering metric.

According to a second aspect, this application provides a routing control apparatus. The apparatus includes: a receiving unit, configured to receive a BGP control packet, where the BGP control packet carries a first node identifier and first algorithm information, the first node identifier indicates an SID of a destination routing node on a BGP forwarding path, the first algorithm information indicates a requirement that the BGP forwarding path meets, the BGP forwarding path includes a routing node that a data packet passes when the data packet is routed from the first edge routing node to the destination routing node, the first edge routing node belongs to a first AS, and the destination routing node belongs to a second AS; a determining unit, configured to determine forwarding path information of the data packet based on the first node identifier and the first algorithm information in the BGP control packet, where the forwarding path information is used to indicate a next-hop routing node of the data packet; and a sending unit, configured to forward the data packet based on the forwarding path information.

In a possible implementation, the BGP forwarding path includes a second edge routing node, and the second edge routing node belongs to the first AS; the receiving unit is further configured to receive a first IGP control packet, where the first IGP control packet carries a second node identifier, and the second node identifier indicates a first SID of the second edge routing node; and the determining unit is configured to determine the forwarding path information based on the first node identifier and the first algorithm information in the BGP control packet and the second node identifier in the first IGP control packet.

In a possible implementation, the forwarding path information includes an SID of each of at least one routing node that the data packet passes when the data packet is routed from the first edge routing node to the second edge routing node, and each of the at least one routing node belongs to the first AS.

In a possible implementation, the BGP forwarding path includes a second edge routing node, and the second edge routing node belongs to the first AS. The receiving unit is further configured to receive a second IGP control packet, where the second IGP control packet carries a third node identifier and second algorithm information, the third node identifier indicates a second SID of the second edge routing node, the second algorithm information indicates a requirement that an IGP forwarding path meets, the IGP forwarding path includes at least one routing node that the data packet passes when the data packet is routed from the first edge routing node to the second edge routing node, and the at least one routing node belongs to the first AS. The determining unit is configured to determine the forwarding path information based on the first node identifier and the first algorithm information in the BGP control packet and the third node identifier and the second algorithm information in the second IGP control packet.

In a possible implementation, the forwarding path information includes the second SID.

In a possible implementation, the BGP control packet includes a first TLV. The first TLV includes a type (T) field, a length (L) field, and a value (V) field. The T field is used to identify that the first TLV field carries the first node identifier and the first algorithm information, the L field is used to indicate a length of the value (V) field, and the V field carries the first node identifier and the first algorithm information.

In a possible implementation, the first algorithm information includes a first algorithm identifier, and the first algorithm identifier is used to identify the requirement that the BGP forwarding path meets.

In a possible implementation, the first algorithm information further includes at least one of a metric type identifier and a calculation type identifier. The metric type identifier is used to indicate a metric type in the requirement that the BGP forwarding path meets, and the calculation type identifier is used to indicate a calculation type in the requirement that the BGP forwarding path meets.

In a possible implementation, the metric type includes at least one of an IGP metric, a low latency metric, and a traffic engineering metric.

According to a third aspect, this application further provides a routing control apparatus. The apparatus includes a processor and a memory. The processor and the memory are coupled. The processor is configured to enable the apparatus to perform the method according to the first aspect or the various possible implementations of the first aspect.

According to a fourth aspect, this application further provides a router. The router includes the routing control apparatus according to the third aspect.

According to a fifth aspect, this application provides a chip apparatus. The apparatus includes an input interface, an output interface, at least one processor, and a memory. The input interface, the output interface, the processor, and the memory communicate with each other by using an internal connection path. The processor is configured to execute code in the memory; and when the processor executes the code, the chip apparatus implements the method according to the first aspect or the various possible implementations of the first aspect.

According to a sixth aspect, this application provides a computer readable storage medium, configured to store a computer program. The computer program includes instructions for implementing the method according to the first aspect or the various possible implementations of the first aspect.

According to a seventh aspect, this application provides a computer program product. The computer program product includes instructions. When the instructions are run on a computer, the computer is enabled to implement the method according to the first aspect or the various possible implementations of the first aspect.

DESCRIPTION OF EMBODIMENTS

The following describes the technical solutions in embodiments of this application with reference to the accompanying drawings in the embodiments of this application.

1. Autonomous System (AS)

An AS is an interconnected network. In an example, an entire Internet is divided into many smaller network units. These small networks are authorized to autonomously determine a routing protocol that should be used in a current system.

Figure 1:
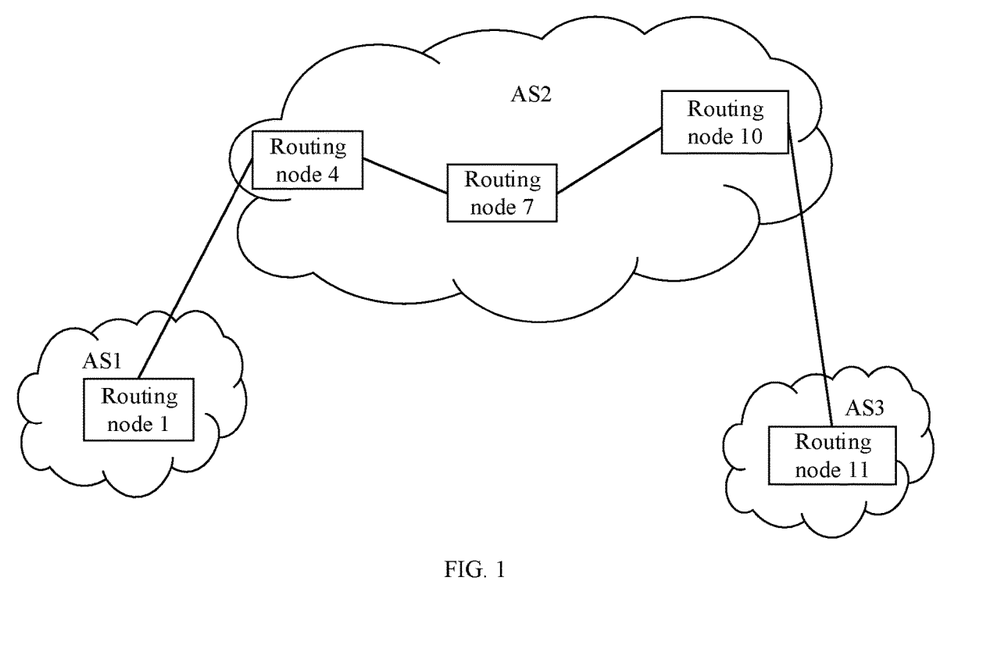
FIG. 1 is a schematic diagram of an application scenario according to an embodiment of this application.

FIG. 1 shows an AS1, an AS2, and an AS3 in an internet.

It should be noted that FIG. 1 illustratively shows the foregoing three ASs in the internet. The internet may alternatively include another quantity of ASs, for example, one, two, or more than three ASs. This is not limited in the embodiments of this application.

2. Router

A router is a major node device in an internet. The router determines data forwarding through routing.

Routers may be categorized into core routers (CRs) and border routers (BRs) based on deployment locations of the routers in a network. In the embodiments of this application, a border router is a router located on an edge of a network and is responsible for intra-AS and inter-AS routing. Correspondingly, a core router is a router located at a center of a network and is responsible for intra-AS routing.

As shown in FIG. 1, the AS1 includes a routing node 1; the AS2 includes a routing node 4, a routing node 7, and a routing node 10; and the AS3 includes a routing node 11.

In FIG. 1, the AS2 is used as an example. The routing node 4 and the routing node 10 in the AS2 may be understood as edge routing nodes (border routing nodes), and the routing node 7 may be understood as a core routing node. In addition, the routing node 4 and the routing node 10 may support both a BGP protocol and an IGP protocol, and the routing node 7 may support the IGP protocol.

It should be noted that the AS1 and the AS3 may further include other edge routing nodes and/or core routing nodes that are not shown.

3. Routing Protocol

Routing protocols may be categorized into two types: A protocol for routing within an AS is referred to as an IGP, for example, Intermediate System-to-Intermediate System (IS-IS) and Open Shortest Path First (OSPF). A protocol for routing between ASs is referred to as an Exterior Gateway Protocol (EGP), for example, a BGP.

As shown in FIG. 1, the routing node 1, the routing node 4, the routing node 10, and the routing node 11 may transmit a control packet to each other by using the BGP protocol; and the routing node 4, the routing node 7, and the routing node 10 may transmit a control packet to each other by using the IGP protocol.

4. MPLS Protocol

In MPLS, a label is stored in an Internet Protocol (IP) protocol packet as a part of the IP protocol packet. Generally, MPLS operates between layer 2 (a data link layer) and layer 3 (a network layer) in Open Systems Interconnection (OSI), and is therefore often considered as a layer 2.5 protocol.

5. SR

SR is a source-based routing technology in which a node and a path that a data packet (packet) that carries an SID list (SID list) passes can be specified, thereby meeting a traffic optimization requirement.

The SR technology includes an SR-best effort (BE) technology and an SR-traffic engineering (TE) technology.

Optionally, in SR-TE, a plurality of SR SIDs are pushed into an MPLS label stack of a data packet, and forwarding of the data packet is guided based on the plurality of SR SIDs.

For example, as shown in FIG. 1, in the AS2, a header of a data packet received by the routing node 4 carries <SID1, SID2>, where the SID1 indicates the routing node 7 and the SID2 indicates the routing node 10. The data packet is first forwarded from the routing node 4 to a routing node (the routing node 7) corresponding to the SID1, and is then forwarded to a routing node (the routing node 10) corresponding to the SID2. Optionally, in SR-BE, one SR SID is pushed into an MPLS label stack of a data packet and is carried at a location of a destination routing node, and the data packet is forwarded to the SR SID along a shortest path.

6. BGP Prefix-SID

A BGP prefix-SID is an SR-based SID. Each BGP node corresponds to one global SID. In other words, a BGP prefix-SID of a routing node can uniquely identify the node in an entire network.

7. BGP Forwarding Path

A BGP forwarding path is a forwarding path that includes a BGP prefix-SID. A path that a packet forwarded based on the BGP forwarding path passes includes an edge routing node that supports a BGP session, and may also include a router node that supports only intra-AS forwarding.

In an MPLS-based SR technology, each routing node has respective SR label space. The label space cannot be allocated to a common MPLS path. In a BGP-based routing process, each routing node is allocated with a label index. Therefore, each routing node may obtain a BGP prefix-SID of the routing node based on the label index and the label space.

For example, label space of the routing node 11 in FIG. 1 is 16000-17000, and a label index of the routing node 11 is 11. Then, an actual BGP prefix-SID of the routing node 11 is 16000+11=16011.

Figure 2:
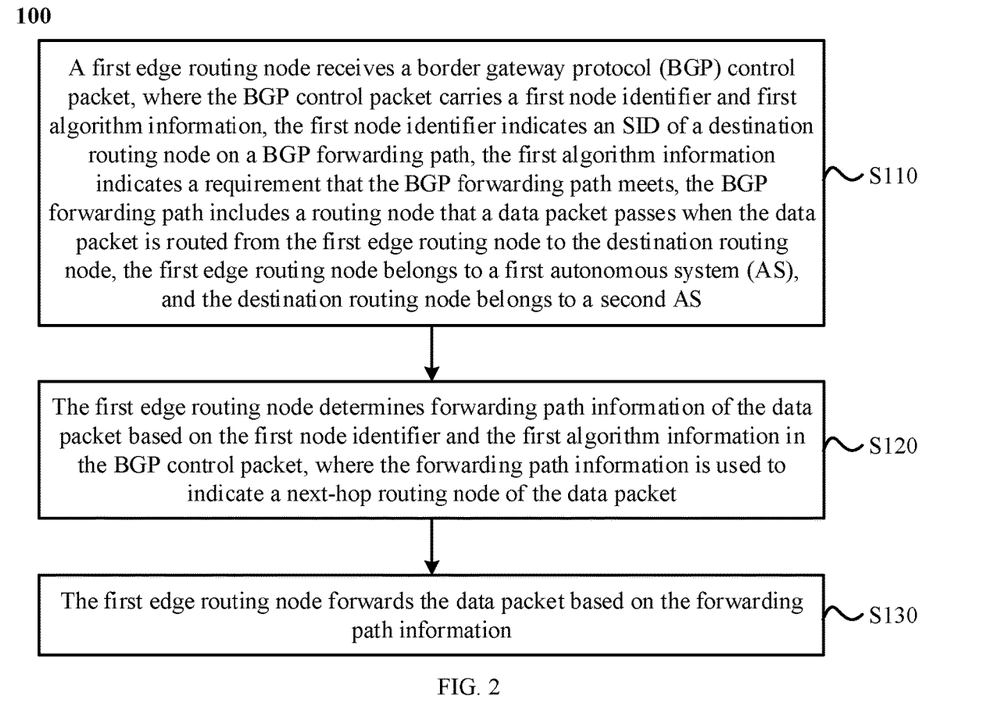
FIG. 2 is a schematic flowchart of a routing control method 100 according to an embodiment of this application.

FIG. 2 is a schematic diagram of a routing control method 100 according to an embodiment of this application. The method 100 may be applied to the application scenario shown in FIG. 1. In the following embodiment, as an example for description, a first edge routing node is the routing node 4, a second edge routing node is the routing node 10, a destination routing node is the routing node 11, a first AS is the AS2, and a second AS is the AS3.

S110. The first edge routing node receives a BGP control packet, where the BGP control packet carries a first node identifier and first algorithm information, the first node identifier indicates an SID of a destination routing node on a BGP forwarding path, the first algorithm information indicates a requirement that the BGP forwarding path meets, the BGP forwarding path includes a routing node that a data packet passes when the data packet is routed from the first edge routing node to the destination routing node, the first edge routing node belongs to the first AS, and the destination routing node belongs to the second AS.

Optionally, the first node identifier may indicate the SID of the destination routing node in a plurality of manners. This is not limited in this embodiment of this application.

In a possible implementation, the first node identifier may be the SID of the destination routing node.

In another possible implementation, the first node identifier may alternatively be a label index of the destination routing node. Correspondingly, the first edge node may determine the SID of the destination routing node based on the label index of the destination routing node and label space of the destination routing node, where the SID of the destination routing node=the label index+the label space.

Optionally, before S110, each routing node on the BGP forwarding path may publish label space of the routing node to other routing nodes on the BGP forwarding path.

Optionally, the first algorithm information may indicate, in a plurality of manners, the requirement that the BGP forwarding path meets. This is not limited in this embodiment of this application.

It should be noted that the requirement that the BGP forwarding path meets may be understood as an optimization objective and/or a constraint of the BGP forwarding path.

In a possible implementation, the first algorithm information may include a first algorithm identifier, and the first algorithm identifier indicates the requirement that the BGP forwarding path meets.

Optionally, a value of the first algorithm identifier may be from 128 to 255. This is not limited in this embodiment of this application.

For example, when the value of the first algorithm identifier is "128", it may indicate that the optimization objective is to minimize a metric.

In another possible implementation, the first algorithm information may include a first algorithm identifier and at least one of a metric type identifier and a calculation type identifier. The metric type identifier is used to indicate a metric type in the requirement that the BGP forwarding path meets, and the calculation type identifier is used to indicate a calculation type in the requirement that the BGP forwarding path meets.

For example, the metric type identifier being "0" represents an IGP metric, the metric type identifier being "1" represents a low latency metric, and the metric type identifier being "2" represents a TE metric.

For example, the calculation type identifier being "0" represents a shortest path first algorithm.

Optionally, the BGP packet may carry the first node identifier and the first algorithm information in a plurality of manners. This is not limited in this embodiment of this application.

In a first possible implementation, the BGP control packet may include a first TLV. The first TLV carries the first node identifier and the first algorithm information.

It should be noted that an existing BGP prefix-SID attribute includes a TLV that can carry a label index of a node. The first TLV in this embodiment of this application may be a newly defined TLV that can carry a label index of a BGP prefix-SID corresponding to an algorithm identifier. In other words, the first TLV may indicate the first node identifier and the first algorithm information that corresponds to the first node identifier.

Figure 3:
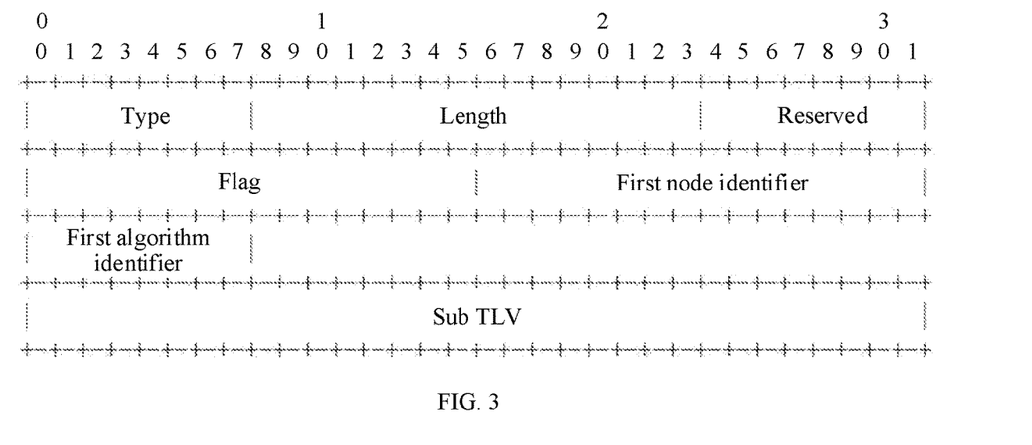
FIG. 3 is a schematic diagram of a TLV according to an embodiment of this application.

For example, a setting of each field in the first TLV field may be shown in FIG. 3. The first TLV includes a 1-byte type (T) field, a 2-byte length (L) field, and a value (V) field. The V field may include a 1-byte reserved field, a 2-byte flag field, a 2-byte field that carries a first node identifier, a 1-byte field that carries the first algorithm identifier, and a sub TLV field.

Figure 4:
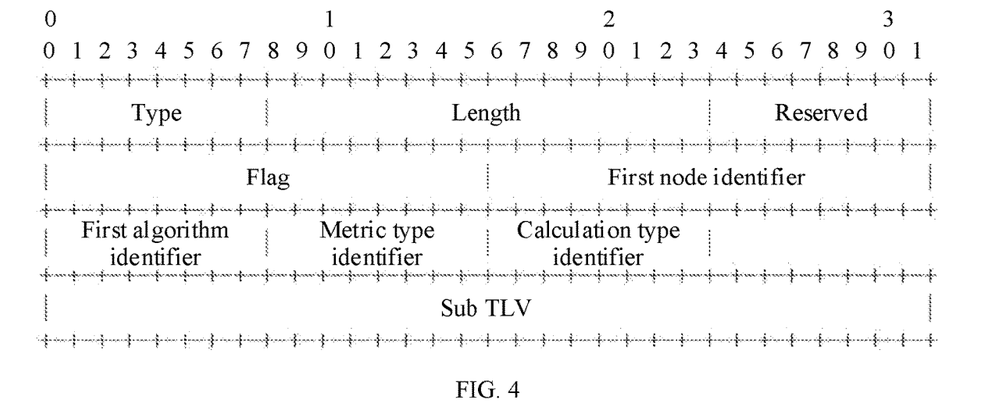
FIG. 4 is a schematic diagram of another TLV according to an embodiment of this application.

For another example, a setting of each field in the first TLV field may be shown in FIG. 4. The first TLV includes a 1-byte T field, a 2-byte L field, and a V field. The V field includes a 1-byte reserved field, a 2-byte flag field, a 2-byte field that carries the first node identifier, a 1-byte field that carries the first algorithm identifier, a 1-byte field that carries the metric type, a 1-byte field that carries the calculation type, and a sub TLV field.

In a second possible implementation, the BGP packet may include a second TLV and a third TLV. The second TLV is used to carry the first node identifier, and the third TLV is used to carry the first algorithm information.

It should be noted that the second TLV may be a TLV that is in an existing BGP prefix-SID attribute and that can carry a label index of a node.

Figure 5:
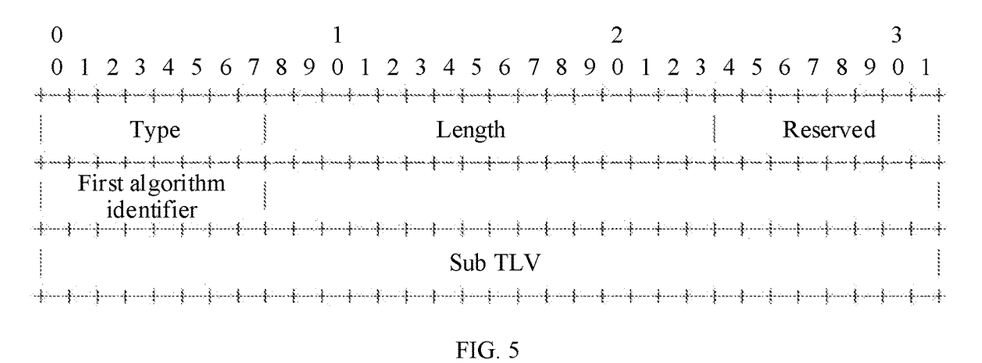
FIG. 5 is a schematic diagram of still another TLV according to an embodiment of this application.

For example, a setting of each field in the third TLV field may be shown in FIG. 5. The third TLV includes a 1-byte T field, a 2-byte L field, and a V field. The V field may include a 1-byte reserved field, a 1-byte field that carries the first algorithm identifier, and a sub TLV field.

Figure 6:
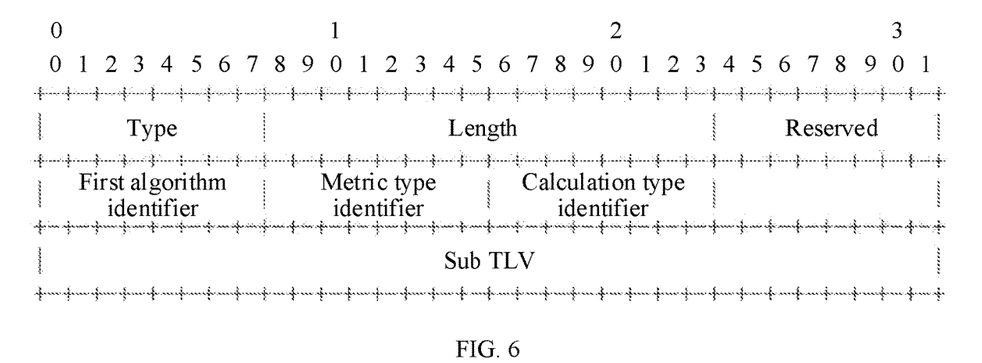
FIG. 6 is a schematic diagram of still another TLV according to an embodiment of this application.

For another example, a setting of each field in the third TLV field may be shown in FIG. 6. The third TLV includes a 1-byte T field, a 2-byte L field, and a V field. The V field may include a 1-byte reserved field, a 1-byte field that carries the first algorithm identifier, a 1-byte field that carries the metric type, a 1-byte field that carries the calculation type, and a sub TLV field.

It should be noted that in the TLV field in this embodiment of this application, the T field is used to identify information carried in the TLV field, the L field is used to indicate a length of the value (V) field, and the V field is used to carry the information. In the V field, the reserved field is used to extend the V field, and the flag field is used to indicate an application scenario or a feature of the BGP prefix-SID (currently, this field can be empty).

It should be further noted that the sub TLVs in FIG. 3 to FIG. 6 are optional. This is not limited in this embodiment of this application. For an example content, refer to a related definition in an SR flexible algorithm in IGP.

It should be further noted that FIG. 3 to FIG. 6 illustratively show the T field, the L field, and the V field in each TLV. A start position and a length of each field in each TLV may be adjusted based on an actual requirement. This is not limited in this embodiment of this application.

Optionally, the BGP forwarding path may include the second edge routing node. The second edge routing node belongs to the first AS. The first edge routing node may receive the BGP control packet sent by the second edge routing node.

S120. The first edge routing node determines forwarding path information of the data packet based on the first node identifier and the first algorithm information in the BGP control packet, where the forwarding path information is used to indicate a next-hop routing node of the data packet.

S130. The first edge routing node forwards the data packet based on the forwarding path information.

In other words, the first edge routing node may determine, based on the first node identifier and the first algorithm information in the BGP control packet, an SID to be pushed into a label stack of the data packet after the first edge routing node receives the data packet; and forward the data packet based on the pushed SID.

In an example, the first edge routing node may look for, based on the SID pushed into the data packet, an outgoing interface that is for the data packet and that is on the first edge routing node; and send the data packet to the next-hop routing node through the outgoing interface.

By using the routing control method provided in this embodiment of this application, the requirement that the BGP forwarding path meets can be specified, and the forwarding path information of the data packet is determined based on the requirement, featuring higher flexibility.

Optionally, the first edge routing node may determine, in a plurality of manners, a forwarding path of the data packet based on the first node identifier and the first algorithm information. This is not limited in this embodiment of this application.

In a first possible implementation, the first edge routing node may further receive a first IGP control packet, where the first IGP control packet carries a second node identifier, and the second node identifier indicates a first SID of the second edge routing node. The first edge routing node may determine the forwarding path information based on the first node identifier, the first algorithm information, and the second node identifier. The forwarding path information includes an SID of each of at least one routing node that the data packet passes when the data packet is routed from the first edge routing node to the second edge routing node, and each of the at least one routing node belongs to the first AS.

It should be noted that the BGP control packet may further include information such as an internet protocol (internet protocol, IP) address, a next hop, and an AS path.

In an example, the first edge routing node may determine, based on the SID that is of the destination routing node and that is indicated by the first node identifier and based on a next hop in the BGP control packet, that when the first edge routing node receives a data packet whose stack top of a label stack is the SID of the destination routing node, a new SID related to the second edge routing node needs to be pushed into the stack top of the label stack.

In an example, the first edge routing node may obtain, through calculation based on the requirement indicated by the first algorithm information and based on the first SID that is of the second edge routing node and that is indicated by the second node identifier, an SID list that is of the second edge routing node and that meets the requirement. The SID list includes the SID of each of the at least one routing node that the data packet passes when the data packet is routed from the first edge routing node to the second edge routing node. In other words, when the first edge routing node receives the data packet whose stack top of the label stack is the SID of the destination routing node, the SID list is further pushed into the stack top of the label stack of the data packet.

In this case, the forwarding path information includes the SID list and the SID of the destination routing node. The SID list in the forwarding path information includes an SID of the next-hop routing node of the data packet. The first edge routing node may determine, based on the SID of the next-hop routing node included in the SID list, an outgoing interface that is for the data packet and that is on the first edge routing node; and send the data packet to the next-hop routing node through the outgoing interface.

In an example, the data packet may be routed from the first edge routing node to the second edge routing node based on the SID included in the SID list in the forwarding path information, and routed from the second edge routing node to the destination routing node based on the SID of the destination routing node in the forwarding path information.

By using the routing control method provided in this embodiment of this application, the data packet may be routed from the first edge routing node to the destination routing node based on the SID of the destination routing node and an SID of each hop of routing node included in the SID list that are pushed into the label stack in sequence. Other passed routing nodes do not need to perform path calculation. Therefore, a calculation workload is relatively light.

In a second possible implementation, the first edge routing node may further receive a second IGP control packet, where the second IGP control packet carries a third node identifier and second algorithm information, the third node identifier indicates a second SID of the second edge routing node, the second algorithm information indicates a requirement that an IGP forwarding path meets, and the IGP forwarding path includes at least one routing node that the data packet passes when the data packet is routed from the first edge routing node to the second edge routing node; and determine the forwarding path information based on the first node identifier, the first algorithm information, the third node identifier, and the second algorithm information. The forwarding path information includes the second SID.

In an example, the first edge routing node may determine, based on the SID that is of the destination routing node and that is indicated by the first node identifier and based on a next hop in the BGP control packet, that when the first edge routing node receives a data packet whose stack top of a label stack is the SID of the destination routing node, a new SID related to the second edge routing node needs to be pushed into the stack top of the label stack.

In an example, when the first edge routing node determines that the requirement indicated by the first algorithm information matches the requirement indicated by the second algorithm information, the first edge routing node may determine, based on the requirement indicated by the second algorithm information and based on the second SID that is of the second edge routing node and that is indicated by the second identifier information, a forwarding table entry to the second edge routing node, where the forwarding table entry already exists in the first edge routing node and meets the requirement. The forwarding table entry includes an SID of the next-hop routing node of the data packet. In other words, when the first edge routing node receives the data packet whose stack top of the label stack is the SID of the destination routing node, the second SID is further pushed into the stack top of the label stack of the data packet.

In an example, the forwarding path information includes the second SID and the SID of the destination routing node. The forwarding path information implicitly indicates the SID of the next-hop routing node of the data packet by using the second SID and the forwarding table entry. An outgoing interface that is for the data packet and that is on the first edge routing node is determined based on the SID of the next-hop routing node, and the data packet is sent to the next-hop routing node through the outgoing interface.

In an example, the data packet may be forwarded from the first edge routing node to the second edge routing node based on the second SID in the forwarding path information and the forwarding table entry, and forwarded from the second edge routing node to the destination routing node along a next hop indicated by the SID of the destination routing node.

By using the routing control method provided in this embodiment of this application, in a forwarding process of the data packet, the label stack needs to carry only the second SID and the SID of the destination routing node. Then, the data packet can be routed, based on the second SID and an intra-AS forwarding table, from the first edge routing node to the second edge routing node indicated by the second SID; and routed, based on the SID of the destination routing node and an inter-AS forwarding table, from the second edge routing node to the destination routing node indicated by the SID of the destination routing node. The data packet carries a relatively small amount of data (in other words, a depth of the label stack is relatively shallow).

In addition, the routing control method provided in this application may further be well compatible with the flexible algorithm in the existing IGP protocol.

Optionally, the second algorithm information may indicate, in a plurality of manners, the requirement that the IGP forwarding path meets. This is not limited in this embodiment of this application.

It should be noted that the requirement that the IGP forwarding path meets may be understood as an optimization objective and/or a constraint that the IGP forwarding path meets.

In a possible implementation, the second algorithm information may include a second algorithm identifier, and the second algorithm identifier indicates the requirement that the IGP forwarding path meets.

Optionally, the second algorithm information may alternatively indicate a metric (metric) type and/or a calculation type in the requirement that the IGP forwarding path meets. This is not limited in this embodiment of this application.

In another possible implementation, the second algorithm information may include a second algorithm identifier and at least one of a second metric type identifier and a second calculation type identifier. The second metric type identifier is used to indicate a metric type in the requirement that the IGP forwarding path meets, and the second calculation type identifier is used to indicate a calculation type in the requirement that the IGP forwarding path meets.

It should be noted that the second SID of the second edge routing node may be understood as an SID associated with the second algorithm information, and may be different from the first SID of the second edge routing node.

It should be further noted that because the first algorithm information indicates the requirement that the BGP forwarding path meets and the second algorithm information indicates the requirement that the IGP forwarding path meets, when receiving the two pieces of algorithm information, the first edge routing node needs to first determine whether the requirements indicated by the two pieces of algorithm information match.

In a possible implementation, the first edge routing node may determine, based on a fact that the first algorithm identifier and the second algorithm identifier are the same, that the requirement indicated by the first algorithm identifier and the requirement indicated by the second algorithm identifier match.

In a possible implementation, the first edge routing node may determine, based on a fact that the metric type and/or the calculation type included in the first algorithm information are/is the same as the metric type and/or the calculation type included in the second algorithm information, that the requirement indicated by the first algorithm identifier and the requirement indicated by the second algorithm identifier match.

The following is an example of a routing control method provided in this application. SR-MPLS is used as an example in this embodiment. In an example, the same technical solution may be applied to SRv6.

As shown in FIG. 1, the AS1, the AS2, and the AS3 are three ASs on the Internet. The AS1 includes the routing node 1; the AS2 includes the routing node 4, the routing node 7, and the routing node 10; and the AS3 includes the routing node 11. The routing node 1, the routing node 4, the routing node 10, and the routing node 11 are all edge routing nodes.

It should be noted that each routing node has sent label space of the routing node to other nodes before the following process. The following process is described by using an example in which label space of all the routing nodes is the same and is 16000. However, this embodiment of this application is not limited thereto.

For example, the routing node 11 publishes the label space 16000 of the routing node 11 to the routing node 10.

First, the routing node 11 may announce a BGP control packet to the routing node 1 in the following process:

1. The routing node 11 may send the following BGP control packet (for a format, refer to a format of a BGP update packet stipulated in Internet Engineering Task Force (IETF) Request for Comments (RFC) 8277) to the routing node 10:
    (1) IP prefix or IP address: 192.0.2.11/32
    (2) Label: implicit-null (an implicit null label)
    (3) Next hop: an interface address of a link through which the routing node 11 is connected to the routing node 10
    (4) AS path: {3}
    (5) BGP prefix-SID index: label index 12
    (6) Algorithm information: 128

In SRv6, "(2) label" and "(5) BGP prefix-SID label" described above may be replaced by an SID in SRv6, and may be, for example, an SID whose length is 128 bits in SRv6.

2. The routing node 10 may send the following BGP control packet (for an example format, refer to a format of a BGP update packet stipulated in IETF RFC8277) to the routing node 4:
    (1) IP prefix or IP address: 192.0.2.11/32
    (2) Label: 16012 (a node identifier of the routing node 11, that is, an SID of the routing node 11)
    (3) Next hop: an interface address of a link through which the routing node 11 is connected to the routing node 10 or a loopback address of the router 10
    (4) AS path: {3, 2}
    (5) BGP prefix-SID index: label index 12
    (6) Algorithm information: 128

3. The routing node 4 may send the following BGP control packet (for an example format, refer to a format of a BGP update packet stipulated in IETF RFC8277) to the routing node 1:
    (1) IP prefix or IP address: 192.0.2.11/32
    (2) Label: 16012
    (3) Next hop: an interface address of a link through which the routing node 4 is connected to the routing node 1
    (4) AS path: {3, 2}
    (5) BGP prefix-SID index: label index 12
    (6) Algorithm information: 128

By using the foregoing procedures 1 to 3, if the routing node 1 has a data packet whose destination IP address is 192.0.2.11 and that needs to be sent to the routing node 11, the SID (that is, 16012) of the routing node 11 is directly pushed into a label stack top of the data packet. Then, traffic can be sent along the following BGP forwarding path: the routing node 1—the routing node 4—the routing node 10—the routing node 11.

For example, if the next hop of the BGP control packet received by the routing node 4 is the loopback address of the routing node 10, when the routing node 4 receives the data packet whose destination IP address is 192.0.2.11 and the label of the label stack top of the data packet is 16012 (e.g., 16012 is an incoming label), an action is to push a new label/label stack, where the new label/label stack is related to the routing node 10.

For another example, if the next hop of the BGP control packet received by the routing node 4 is the interface address of the link through which the routing node 11 is connected to the routing node 10, the routing node 4 learns, through matching, that a routing entry to the interface address of the link through which the routing node 11 is connected to the routing node 10 can be provided by the routing node 10. Therefore, a BGP route is iterated to a label/label stack of the routing node 10. Similarly, at the routing node 4, for the incoming label 16012 in the received data packet, an action is to push a new label/label stack, where the new label/label stack is related to the routing node 10.

Optionally, before forwarding a data packet, the routing node 10 may further publish an IGP control packet to the routing node 4 based on a conventional technology. Correspondingly, if the routing node 4 has a data packet that needs to be sent to the routing node 10, traffic may be sent along the following IGP forwarding path: the routing node 4—the routing node 7—the routing node 10.

In an example, a data packet may be routed from the routing node 1 to the routing node 11 in the following process. A destination IP address of the data packet is 192.0.2.11/32.

1. At the routing node 1: A label 16012 is added to the data packet, a label forwarding table is looked up to obtain an outgoing interface to the routing node 4 at a next hop, and the data packet that carries the label 16012 is sent through the outgoing interface.

2. At the routing node 4: The incoming label 16012 is pushed into a stack top label of the received data packet, and a label-related action is to push a label. In an example, a label/label stack may be pushed. A next hop of a BGP route is the routing node 10. (In an example, a next-hop routing node for forwarding in the AS2 is determined based on a pushed label stack and may be another node).

In a first possible implementation, the IGP control packet carries a second SID (for example, 16110) and an IGP algorithm identifier (for example, 128) of the routing node 10. Then, when determining that the IGP algorithm identifier and the BGP algorithm identifier are the same, the routing node 4 pushes the label 16110 (in an example, a stack top is 16110), and forwards the data packet based on 16110. The routing node 4 already has an IGP forwarding table entry to 16110 with the algorithm identifier 128, and the IGP forwarding table entry includes 16007, where 16007 indicates that a next hop of the data packet is the routing node 7. Therefore, a path along which the routing node 4 sends the data packet to the routing node 10 meets a requirement of the algorithm identifier 128.

Correspondingly, at the routing node 7: A stack top label of the received data packet is an incoming label 16110, and an outgoing interface to the routing node 10 at a next hop is obtained through querying based on the incoming label 16110. The routing node 7 knows that the routing node 7 is a penultimate hop to the routing node 10 in IGP, and the routing node 7 pops 16110. In this case, a stack top of a label stack is 16012. At the routing node 10: A stack top label of the received data packet is an incoming label 16012.

In a second possible implementation, the IGP control packet carries a first SID (for example, 16010) of the routing node 10 but does not carry an algorithm identifier. Then, at the routing node 4: The routing node 4 may calculate a path to 16010 based on a requirement of an algorithm identifier 128, or request a controller to calculate an SID list <16007, 16010> to 16010 based on a requirement indicated by a BGP algorithm identifier (that is, 128), where 16007 is an SID of the routing node 7; and then push labels 16007 and 16010 into the data packet and forward the data packet based on 16007. In an example, a pop operation is performed to pop 16007.

Correspondingly, at the routing node 7: A stack top label of the received data packet is an incoming label 16010. A pop operation is performed, where a newly popped stack top label is 16012. An outgoing interface to the routing node 10 at a next hop is obtained through querying based on 16012.

3. At the routing node 10: A stack top label of the received data packet is an incoming label 16012. A pop operation is performed to pop 16012. An outgoing interface to the routing node 11 at a next hop is obtained through querying, and the data packet is sent through the outgoing interface.

4. At the routing node 11: An IP data packet without a label is received.

The foregoing describes the routing control method provided in the embodiments of this application with reference to FIG. 1 to FIG. 6. The following describes a routing control apparatus provided in the embodiments of this application with reference to FIG. 7 and FIG. 8.

Figure 7:
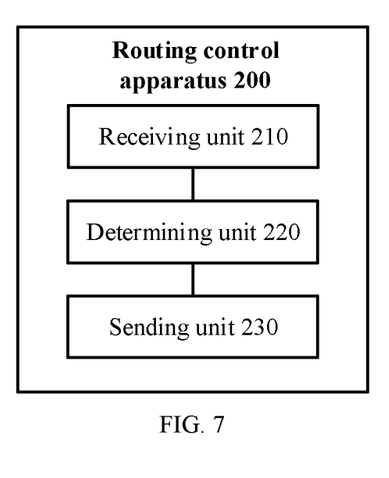
FIG. 7 is a schematic block diagram of a routing control apparatus 200 according to an embodiment of this application.

FIG. 7 is a schematic block diagram of a routing control apparatus 200 according to an embodiment of this application. The apparatus 200 includes a receiving unit 210 configured to receive a BGP control packet, where the BGP control packet carries a first node identifier and first algorithm information, the first node identifier indicates an SID of a destination routing node on a BGP forwarding path, the first algorithm information indicates a requirement that the BGP forwarding path meets, the BGP forwarding path includes a routing node that a data packet passes when the data packet is routed from the first edge routing node to the destination routing node, the first edge routing node belongs to a first AS, and the destination routing node belongs to a second AS; a determining unit 220 configured to determine forwarding path information of the data packet based on the first node identifier and the first algorithm information in the BGP control packet, where the forwarding path information is used to indicate a next-hop routing node of the data packet; and a sending unit 230 configured to forward the data packet based on the forwarding path information.

In a possible implementation, the BGP forwarding path includes a second edge routing node, and the second edge routing node belongs to the first AS; the receiving unit is further configured to receive a first IGP control packet, where the first IGP control packet carries a second node identifier, and the second node identifier indicates a first SID of the second edge routing node; and the determining unit 220 is configured to determine the forwarding path information based on the first node identifier and the first algorithm information in the BGP control packet and the second node identifier in the first IGP control packet.

In a possible implementation, the forwarding path information includes an SID of each of at least one routing node that the data packet passes when the data packet is routed from the first edge routing node to the second edge routing node, and each of the at least one routing node belongs to the first AS.

In a possible implementation, the BGP forwarding path includes a second edge routing node, and the second edge routing node belongs to the first AS; the receiving unit is further configured to receive a second IGP control packet, where the second IGP control packet carries a third node identifier and second algorithm information, the third node identifier indicates a second SID of the second edge routing node, the second algorithm information indicates a requirement that an IGP forwarding path meets, the IGP forwarding path includes at least one routing node that the data packet passes when the data packet is routed from the first edge routing node to the second edge routing node, and the at least one routing node belongs to the first AS; and the determining unit 220 is configured to determine the forwarding path information based on the first node identifier and the first algorithm information in the BGP control packet and the third node identifier and the second algorithm information in the second IGP control packet.

In a possible implementation, the forwarding path information includes the second SID.

In a possible implementation, the BGP control packet includes a first TLV. The first TLV includes a T field, a L field, and a v ( ) field. The T field is used to identify that the first TLV field carries the first node identifier and the first algorithm information, the L field is used to indicate a length of the V field, and the V field carries the first node identifier and the first algorithm information.

In a possible implementation, the first algorithm information includes a first algorithm identifier, and the first algorithm identifier is used to identify a requirement that is met when the BGP forwarding path is calculated.

In a possible implementation, the first algorithm information further includes at least one of a metric type identifier and a calculation type identifier, the metric type identifier is used to indicate a metric type in the requirement that is met when the BGP forwarding path is calculated, and the calculation type identifier is used to indicate a calculation type in the requirement that is met when the BGP forwarding path is calculated.

In a possible implementation, the metric type includes at least one of an IGP metric, a low latency metric, and a traffic engineering metric.

It should be understood that the apparatus 200 herein is embodied in the form of functional units. The term "unit" herein may refer to an application-specific integrated circuit (ASIC), an electronic circuit, a processor (for example, a shared processor, a special purpose processor, or a group processor) configured to execute one or more software or firmware programs, a memory, a merged logic circuit, and/or another appropriate component that supports the described functions. In an optional example, a person skilled in the art may understand that the apparatus 200 may be the first edge routing node in the foregoing embodiment of the method 100. The apparatus 200 may be configured to perform procedures and/or steps in the foregoing embodiment of the method 100 that correspond to the first edge routing node. To avoid repetition, details are not described herein again.

Figure 8:
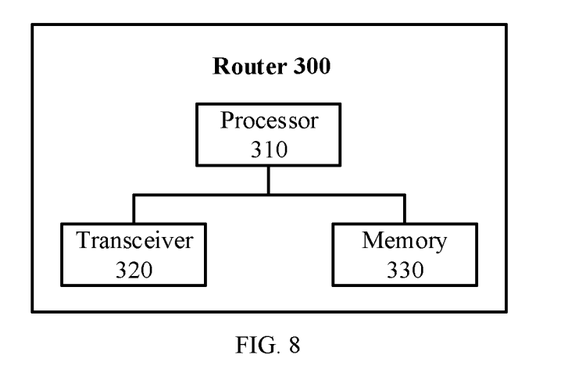
FIG. 8 is a schematic block diagram of a router 300 according to an embodiment of this application.

FIG. 8 shows a router 300 according to an embodiment of this application. The router 300 may include the apparatus 200 described in FIG. 7, or the router 300 may be the apparatus 200 described in FIG. 7. The apparatus 200 may use a hardware architecture shown in FIG. 8. The router 300 may include a processor 310, a transceiver 320, and a memory 330. The processor 310, the transceiver 320, and the memory 330 communicate with each other by using an internal connection path. Related functions implemented by the determining unit 220 in FIG. 7 may be implemented by the processor 310, related functions implemented by the receiving unit 210 and the sending unit 230 may be implemented by the processor 310 by controlling the transceiver 320.

The processor 310 may include one or more processors, for example, include one or more central processing units (CPUs). When the processor is one CPU, the CPU may be a single-core CPU or a multi-core CPU.

The transceiver 320 is configured to send and receive data and/or information, and receive data and/or information. The transceiver may include a transmitter and a receiver. The transmitter is configured to send data and/or a signal, and the receiver is configured to receive data and/or a signal.

The memory 330 includes but is not limited to a random access memory (RAM), a read-only memory (ROM), an erasable programmable memory (EPROM), and a compact disc read-only memory (CD-ROM). The memory 330 is configured to store related instructions and data.

The memory 330 is configured to store program code and data of the apparatus, and may be a separate device or may be integrated into the processor 310.

In an example, the processor 310 is configured to control the transceiver to transmit a signal with another routing node in a network. For an example, refer to the descriptions in the foregoing method embodiments. Details are not described herein again.

It can be understood that FIG. 8 shows a simplified design of the apparatus. During actual application, the apparatus may further include other necessary components, including but not limited to any quantity of transceivers, processors, controllers, memories, and the like, and all apparatuses that can implement this application shall fall within the protection scope of this application.

In a possible design, the router 300 may be replaced with a chip apparatus, for example, router 300 may be a communications chip that may be used in the apparatus, and is configured to implement related functions of the processor in the apparatus. The chip apparatus may be a field programmable gate array (FPGA), a dedicated integrated chip, a system chip, a CPU, a network processor, a digital signal processing circuit, a microcontroller, a programmable controller, or another integrated chip for implementing related functions. Optionally, the chip may include one or more memories, configured to store program code. When the code is executed, the processor is enabled to implement a corresponding function.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint requirements of the technical solutions. A person skilled in the art may use a different method to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in another manner. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or a part contributing to an existing technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a Universal Serial Bus (USB) flash drive, a removable hard disk drive, a ROM, a RAM, a magnetic disk, or a compact disc.

The foregoing descriptions are implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A routing control method implemented by a first edge routing node and comprising:
    receiving a border gateway protocol (BGP) control packet, wherein the BGP control packet carries a first node identifier and first algorithm information, wherein the first node identifier indicates a segment identifier (SID) of a destination routing node on a BGP forwarding path, wherein the first algorithm information indicates comprises a first algorithm identifier and at least one of a metric type identifier or a calculation type identifier, wherein the first algorithm identifier identifies a requirement of the BGP forwarding path, wherein the metric type identifier indicates a metric type in the requirement of the BGP forwarding path, wherein the calculation type identifier indicates a calculation type in the requirement of the BGP forwarding path, wherein the BGP forwarding path comprises a routing node for a data packet that is routed from the first edge routing node to the destination routing node, and wherein the first edge routing node belongs to a first autonomous system (AS) and the destination routing node belongs to a second AS; and
    forwarding the data packet based on forwarding path information of the data packet, wherein the forwarding path information indicates a next-hop routing node of the data packet, and wherein the forwarding path information is based on the first node identifier and the first algorithm information.

2. The routing control method of claim 1, wherein the BGP forwarding path comprises a second edge routing node that belongs to the first AS, and wherein the routing control method further comprises receiving a first Interior Gateway Protocol (IGP) control packet, wherein the first IGP control packet carries a second node identifier that indicates a first SID of the second edge routing node, and wherein the forwarding path information of the data packet is further based on the second node identifier.

3. The routing control method of claim 2, wherein the forwarding path information comprises a SID of each routing node that the data packet passes when the data packet is routed from the first edge routing node to the second edge routing node, and wherein the each routing node belongs to the first AS.

4. The routing control method of claim 1, wherein the BGP forwarding path comprises a second edge routing node that belongs to the first AS, and wherein the routing control method further comprises receiving a second Interior Gateway Protocol (IGP) control packet, wherein the second IGP control packet carries a third node identifier and second algorithm information, wherein the third node identifier indicates a second SID of the second edge routing node, wherein the second algorithm information indicates a requirement of a IGP forwarding path, wherein the IGP forwarding path comprises at least one routing node for the data packet that is routed from the first edge routing node to the second edge routing node, and wherein the at least one routing node belongs to the first AS, and wherein the forwarding path information of the data packet is further based on the third node identifier and the second algorithm information in the second IGP control packet.

5. The routing control method of claim 4, wherein the forwarding path information comprises the second SID.

6. The routing control method of claim 1, wherein the BGP control packet comprises a first type-length-value (TLV) field, wherein the first TLV field comprises a type (T) field, a length (L) field, and a value (V) field, wherein the T field indicates that the first TLV field carries the first node identifier and the first algorithm information, wherein the L field indicates a length of the V field, and wherein the V field carries the first node identifier and the first algorithm information.

7. The routing control method of claim 1, wherein the metric type comprises at least one of an IGP metric, a low latency metric, or a traffic engineering metric.

8. A routing control apparatus of a first edge routing node, comprising:
a memory configured to store instructions; and
at least one processor coupled to the memory and configured to execute the instructions that when executed by the at least one processor cause the routing control apparatus to:
receive a border gateway protocol (BGP) control packet, wherein the BGP control packet carries a first node identifier and first algorithm information, wherein the first node identifier indicates a segment identifier (SID) of a destination routing node on a BGP forwarding path, wherein the first algorithm information comprises a first algorithm identifier and at least one of a metric type identifier or a calculation type identifier, wherein the first algorithm identifier identifies a requirement of the BGP forwarding path, wherein the metric type identifier indicates a metric type in the requirement of the BGP forwarding path, wherein the calculation type identifier indicates a calculation type in the requirement of the BGP forwarding path, wherein the BGP forwarding path comprises a routing node for a data packet that is routed from the first edge routing node to the destination routing node, wherein the first edge routing node belongs to a first autonomous system (AS) and the destination routing node belongs to a second AS; and
forward the data packet based on forwarding path information of the data packet, wherein the forwarding path information indicates a next-hop routing node of the data packet, and wherein the forwarding path information is based on the first node identifier and the first algorithm information.

9. The routing control apparatus of claim 8, wherein the BGP forwarding path comprises a second edge routing node that belongs to the first AS, and wherein the at least one processor is further configured to execute the instructions to cause the routing control apparatus to receive a first Interior Gateway Protocol (IGP) control packet, wherein the first IGP control packet carries a second node identifier that indicates a first SID of the second edge routing node, and wherein the forwarding path information is further based on the second node identifier.

10. The routing control apparatus of claim 9, wherein the forwarding path information comprises a SID of each routing node that the data packet passes when the data packet is routed from the first edge routing node to the second edge routing node, and wherein the each routing node belongs to the first AS.

11. The routing control apparatus of claim 8, wherein the BGP forwarding path comprises a second edge routing node that belongs to the first AS, and wherein the at least one processor is further configured to execute the instructions to cause the routing control apparatus to receive a second Interior Gateway Protocol (IGP) control packet, wherein the second IGP control packet carries a third node identifier and second algorithm information, wherein the third node identifier indicates a second SID of the second edge routing node, wherein the second algorithm information indicates a requirement of a IGP forwarding path, wherein the IGP forwarding path comprises at least one routing node for the data packet that is routed from the first edge routing node to the second edge routing node, and wherein the at least one routing node belongs to the first AS, and wherein the forwarding path information is further based on the third node identifier and the second algorithm information in the second IGP control packet.

12. The routing control apparatus of claim 11, wherein the forwarding path information comprises the second SID.

13. The routing control apparatus of claim 8, wherein the BGP control packet comprises a first type-length-value (TLV) field, wherein the first TLV field comprises a type (T) field, a length (L) field, and a value (V) field, wherein the T field indicates that the first TLV field carries the first node identifier and the first algorithm information, wherein the L field indicates a length of the V field, and wherein the V field carries the first node identifier and the first algorithm information.

14. The routing control apparatus of claim 8, wherein the metric type comprises at least one of an IGP metric, a low latency metric, or a traffic engineering metric.

15. A computer program product comprising computer-executable instructions for storage on a non-transitory computer-readable medium that when executed by at least one processor cause an edge routing node to:
receive a border gateway protocol (BGP) control packet, wherein the BGP control packet carries a first node identifier and first algorithm information, wherein the first node identifier indicates a segment identifier (SID) of a destination routing node on a BGP forwarding path, wherein the first algorithm information comprises a first algorithm identifier and at least one of a metric type identifier or a calculation type identifier, wherein the first algorithm identifier identifies a requirement of the BGP forwarding path, wherein the metric type identifier indicates a metric type in the requirement of the BGP forwarding path, wherein the calculation type identifier indicates a calculation type in the requirement of the BGP forwarding path, wherein the BGP forwarding path comprises a routing node for a data packet that is routed from the edge routing node to the destination routing node, and wherein the edge routing node belongs to a first autonomous system (AS) and the destination routing node belongs to a second AS; and
forward the data packet based on forwarding path information of the data packet, wherein the forwarding path information indicates a next-hop routing node of the data packet, and wherein the forwarding path information is based on the first node identifier and the first algorithm information.

16. The computer program product of claim 15, wherein the BGP forwarding path comprises a second edge routing node that belongs to the first AS, and wherein the computer-executable instructions that when executed by the at least one processor further cause the edge routing node to receive a first Interior Gateway Protocol (IGP) control packet, wherein the first IGP control packet carries a second node identifier that indicates a first SID of the second edge routing node, and wherein the forwarding path information is further based on the second node identifier.

17. The computer program product of claim 16, wherein the forwarding path information comprises a SID of each routing node that the data packet passes when the data packet is routed from the edge routing node to the second edge routing node, and wherein the each routing node belongs to the first AS.

18. The computer program product of claim 15, wherein the BGP forwarding path comprises a second edge routing node that belongs to the first AS, and wherein the computer-executable instructions that when executed by the at least one processor further cause the edge routing node to receive a second Interior Gateway Protocol (IGP) control packet, wherein the second IGP control packet carries a third node identifier and second algorithm information, wherein the third node identifier indicates a second SID of the second edge routing node, wherein the second algorithm information indicates a requirement of a IGP forwarding path, wherein the IGP forwarding path comprises at least one routing node for the data packet that is routed from the edge routing node to the second edge routing node, and wherein the at least one routing node belongs to the first AS, and wherein the forwarding path information is further based on the third node identifier and the second algorithm information in the second IGP control packet.

19. The computer program product of claim 18, wherein the forwarding path information comprises the second SID.

20. The computer program product of claim 15, wherein the BGP control packet comprises a first type-length-value (TLV) field, wherein the first TLV field comprises a type (T) field, a length (L) field, and a value (V) field, wherein the T field indicates that the first TLV field carries the first node identifier and the first algorithm information, wherein the L field indicates a length of the V field, and wherein the V field carries the first node identifier and the first algorithm information.

* * * * *

UNITED STATES PATENT AND TRADEMARK OFFICE
CERTIFICATE OF CORRECTION

PATENT NO. : 12,267,226 B2
APPLICATION NO. : 17/707177
DATED : April 1, 2025
INVENTOR(S) : Jie Dong and Zongpeng Du

Page 1 of 1

It is certified that error appears in the above-identified patent and that said Letters Patent is hereby corrected as shown below:

In the Claims

Claim 1, Column 19, Lines 65-66: "information indicates comprises" should read "information comprises"

Signed and Sealed this
Twenty-seventh Day of May, 2025

Coke Morgan Stewart
*Acting Director of the United States Patent and Trademark Office*